United States Patent [19]

Kitagawa

[11] Patent Number: 5,188,004
[45] Date of Patent: Feb. 23, 1993

[54] TURNTABLE APPARATUS FOR UNIVERSAL MACHINE TOOL

[75] Inventor: Hiroshi Kitagawa, Fukui, Japan

[73] Assignee: Kabushiki Kaisha Komatsu Seisakusho, Tokyo, Japan

[21] Appl. No.: 690,891

[22] Filed: Jun. 14, 1991

[30] Foreign Application Priority Data

Dec. 21, 1988 [JP] Japan .................. 63-320469

[51] Int. Cl.⁵ .................................. B23B 23/24
[52] U.S. Cl. ..................... 74/813 R; 74/813 C; 74/813 L; 74/409
[58] Field of Search ........... 74/813 R, 813 C, 813 L, 74/825, 427, 409

[56] References Cited

U.S. PATENT DOCUMENTS

| | | | |
|---|---|---|---|
| 3,075,614 | 1/1963 | Grundon | 184/6 |
| 3,971,293 | 5/1980 | Hunkeler . | |
| 4,325,015 | 4/1982 | Heiberger | 318/625 |
| 4,558,611 | 12/1985 | Boffelli | 74/813 C |
| 4,785,513 | 11/1988 | Lee et al. | 74/813 R |
| 4,905,543 | 3/1990 | Choi | 74/813 R |
| 5,075,955 | 12/1991 | Chang | 74/813 L |
| 5,090,267 | 2/1992 | Gramling | 74/409 X |

FOREIGN PATENT DOCUMENTS

| | | |
|---|---|---|
| 1171705 | 6/1964 | Fed. Rep. of Germany . |
| 3225195 | 1/1984 | Fed. Rep. of Germany . |
| 3714087 | 11/1987 | Fed. Rep. of Germany . |
| 50-113886 | 9/1975 | Japan . |
| 55-65056 | 5/1980 | Japan . |
| 56-2339 | 1/1981 | Japan . |
| 58-500009 | 11/1983 | Japan . |
| 63-120052 | 5/1988 | Japan . |
| 0145240 | 6/1990 | Japan .................. 74/813 R |
| 2126314A | 3/1984 | United Kingdom . |

OTHER PUBLICATIONS

Engine Fluide Etelubrification, vol. 10, No. 40, Jun. 1971, pp. 69-73, Paris, FR: "Cours de lubrification" p. 72, right-hand column, lines 40-44*.

*Primary Examiner*—Vinh T. Luong
*Attorney, Agent, or Firm*—Armstrong, Westerman, Hattori, McLeland & Naughton

[57] ABSTRACT

A turntable apparatus has a turntable in combination with an indexing mechanism for use in a universal machine tool. The turntable has a spindle, and a turntable driving system is provided for driving the turntable. A driving system is used for driving an indexing mechanism for separately driving the turntable, and has an indexing shaft. A first arrangement is provided for clamping the main spindle of the turntable, and a second arrangement is provided for clamping the indexing shaft of the indexing mechanism driving system. A backlash-eliminating arrangment is provided for eliminating backlash in each of the turntable driving system and the driving system for the indexing mechanism, so that the turntable can be rotated by the driving system to conduct indexing of the turntable in a condition where an output torque developed by the turntable driving system is limited to a relatively low level, and wherein, after positioning of the turntable, the main spindle of the turntable and an indexing shaft of the indexing mechanism driving system are clamped at the same time in a condition such that the backlash in each of the driving systems has been eliminated by the backlash-eliminating arrangement.

2 Claims, 5 Drawing Sheets

SECTION A-A

SECTION B-B

TURNTABLE APPARATUS FOR UNIVERSAL MACHINE TOOL

TECHNICAL FIELD OF THE INVENTION

This invention relates to a turntable apparauts for use in a universal machine tool, and more particularly to a turntable apparatus which is capable of preventing lowering of indexing accuracies at the time of positioning of a work and at the time of clamping of the same and also preventing changes between the indexing accuracy obtained upon positioning of the work and that obtained upon clamping of the same.

BACKGROUND ART OF THE INVENTION

A prior art turntable provided in universal machine tools of the kind specified above has an indexing mechanism as shown in FIG. 1, which conducts indexing of a work to be machined, not shown, (that will be simply referred to as "work" hereinbelow) mounted on the turntable "a" as follows.

Upon indexing, first of all, a piston in a clamp cylinder "b" for driving the turntable is actuated in a direction shown by arrow C so as to urge a worm "f" against a worm wheel "e" engaged with a main gear "d" adapted to rotatively drive the turntable "a" to thereby eliminate backlash between the engaged teeth, and then an indexing motor "g" is driven to rotate the main gear "d" through the above-mentioned worm "f" and worm wheel "e" so as to index the work, not shown, on the turntable "a".

After the indexing of the work, a locking cylinder "h" is actuated to drive a wedge member "i" so as to stop the axial movement of the worm "f" thereby clamping the turntable "a" at the indexing position.

The above-mentioned prior art indexing mechanism has however the following disadvantage. That is to say, because the driving system includes the worm "f" and the worm wheel "e", it is necessary to lubricate the worm "f" and the worm wheel "e" with a lubricating oil. Such lubrication needs the use of a lubricating oil having a high viscosity, which generates a considerable amount of heat during high speed running., thus causing a deformation of the turntable "a" due to the heat thus generated, thereby lowering the working accuracy.

Further, even if the indexing position of the work is set accurately, when clamping the turntable "a" by driving the wedge member "i" through the action of the locking cylinder "h" after the indexing, the wedge member "i" is urged towards the worm "f" in the axial direction thereof, thus causing such a disadvantage as changes between the indexing accuracy obtained upon positioning and that obtained upon clamping.

SUMMARY OF THE INVENTION

The present invention has been made in view of the above-mentioned circumstances in the prior art, and has for its object to provide a turntable apparatus for use in a universal machine tool, which is capable of preventing lowering of indexing accuracies at the time of positioning of an work and at the time of clamping of the same and also preventing the occurrence of changes between the indexing accuracy obtained upon positioning of the work and that obtained upon clamping of the same.

To achieve the above-mentioned object, according to a first aspect of the present invention, there is provided a turntable apparatus provided with an indexing mechanism for use in a universal machine tool arranged such that a turntable driving system and a driving system for an indexing mechanism are provided separately from each other, and the turntable is rotated by the driving system of the indexing mechanism so as to conduct indexing of the turntable in a condition wherein the output torque developed by the turntable driving system is limited. Such arrangement enables an indexing of the turntable to be made in a condition wherein the backlash in each of the driving system has been eliminated with the result that the positioning accuracy can be improved.

Further, according to a second aspect of the present invention, there is provided a turntable apparatus for use in a universal machine tool arranged such that after the positioning of the turntable a main spindle of the turntable and an indexing shaft of the indexing mechanism are clamped at the same time in a condition wherein the backlash in each of the driving systems has been eliminated. Therefore, clamping of the turntable can be conducted in a pressurized condition.

Still further, according to a third aspect of the present invention, there is provided a turntable apparatus for use in a universal machine tool arranged such that a lubricating system for lubricating a worm driving system of the indexing mechanism and a lubricating system for lubricating a transmission driving system are provided separately from each other, and the worm driving system is lubricated with a lubricating oil having a high viscosity, whilst the transmission driving system is lubricated with a lubricating oil having a low viscosity. By this arrangement, the amount of heat generated when working or machining a work can be reduced.

The above-mentioned and other objects, aspects and advantages of the present invention will become apparent to those skilled in the art from the following detailed description and the accompanying drawings in which a preferred embodiment incorporating the principles of the present invention is shown for example only.

DETAILED DESCRIPTION OF PREFERRED EMBODIMENT

Figure 1:
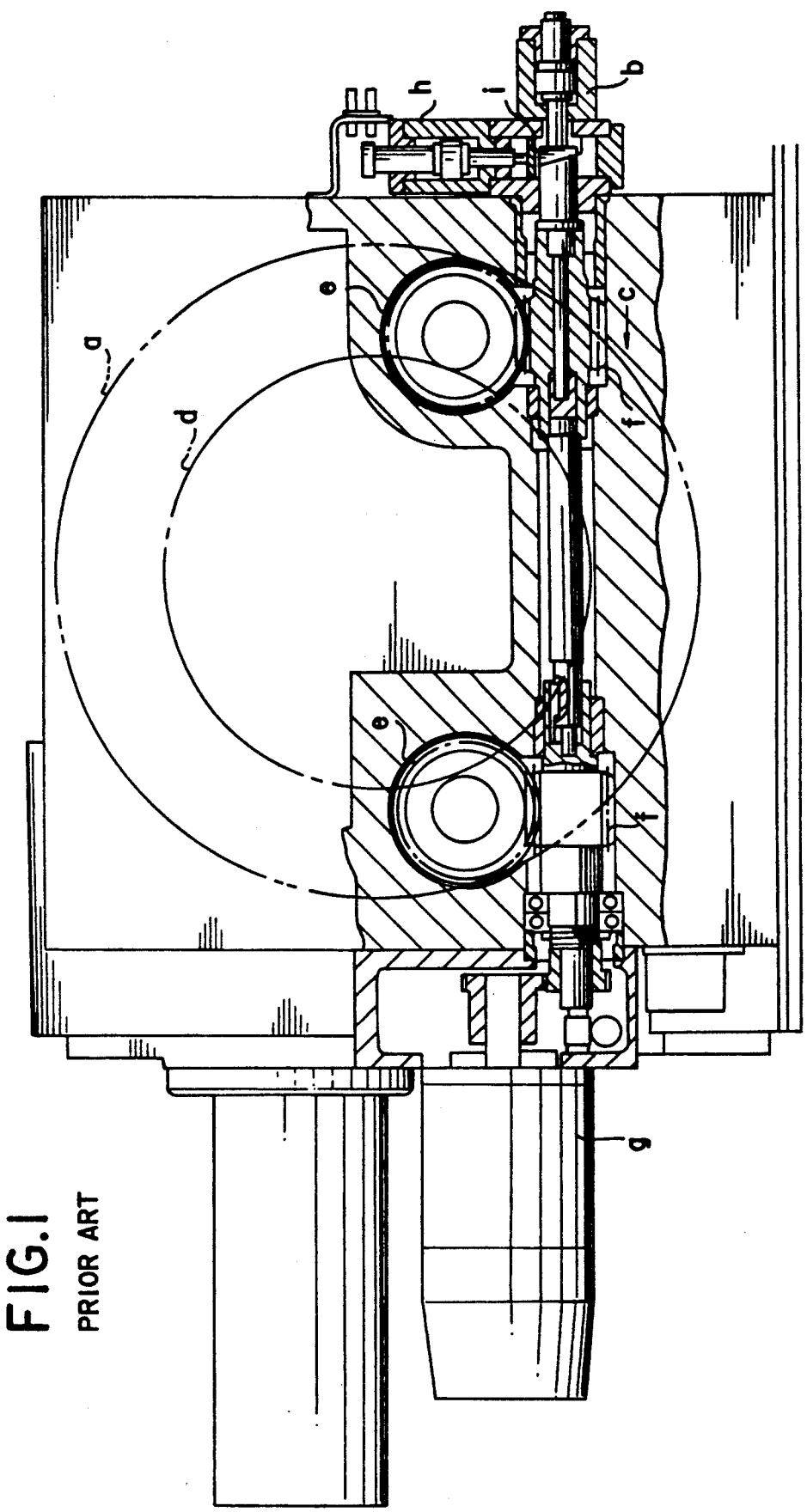
FIG. 1 is a schematic plan view of a prior art embodiment of machine tool including the partial horizontal sectional view thereof.
Figure 2:
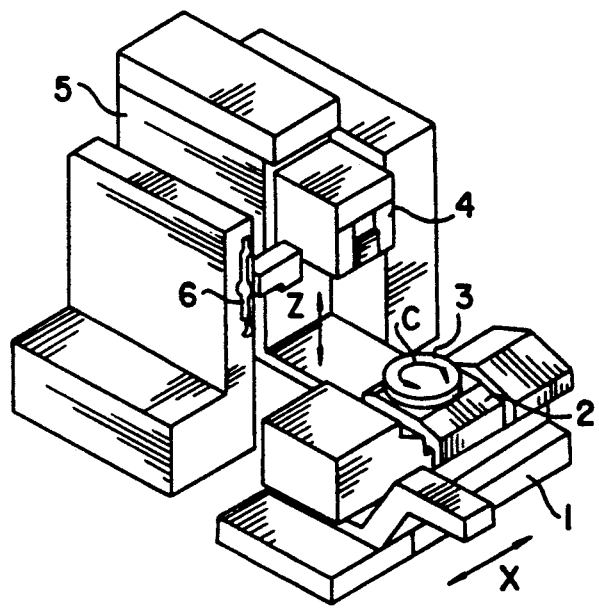
FIG. 2 is a schematic perspective view of a universal machine tool.
Figure 3:
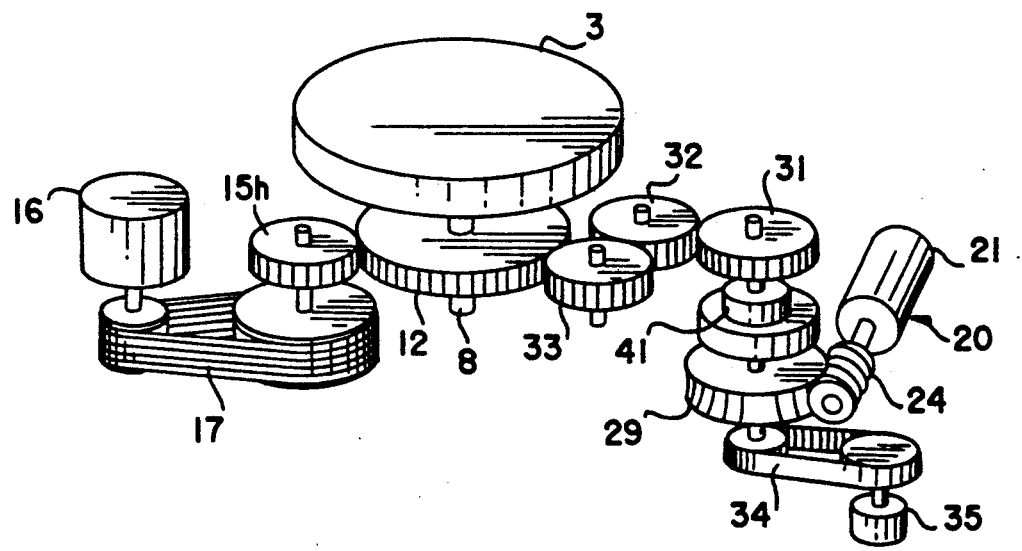
FIG. 3 is an explanatory view showing a turntable driving system and an indexing mechanism driving system according to one embodiment of the present invention.

FIG. 2 shows a machine tool wherein a base table 2 is mounted on a bed 1 such that it may be moved freely in the directions of the X axis and a turntable 3 is mounted on the base table 2 such that it may be rotated freely in the directions shown by arrow C.

Further, reference numeral 4 denotes a spindle head mounted on the front surface of a column 5 such that it may be moved freely in the directions of Z axis, and 6 an automatic tool exchanging means.

Whilst, the central portion of the above-mentioned turntable 3 is fixedly secured to a main spindle 8.

Figure 4:
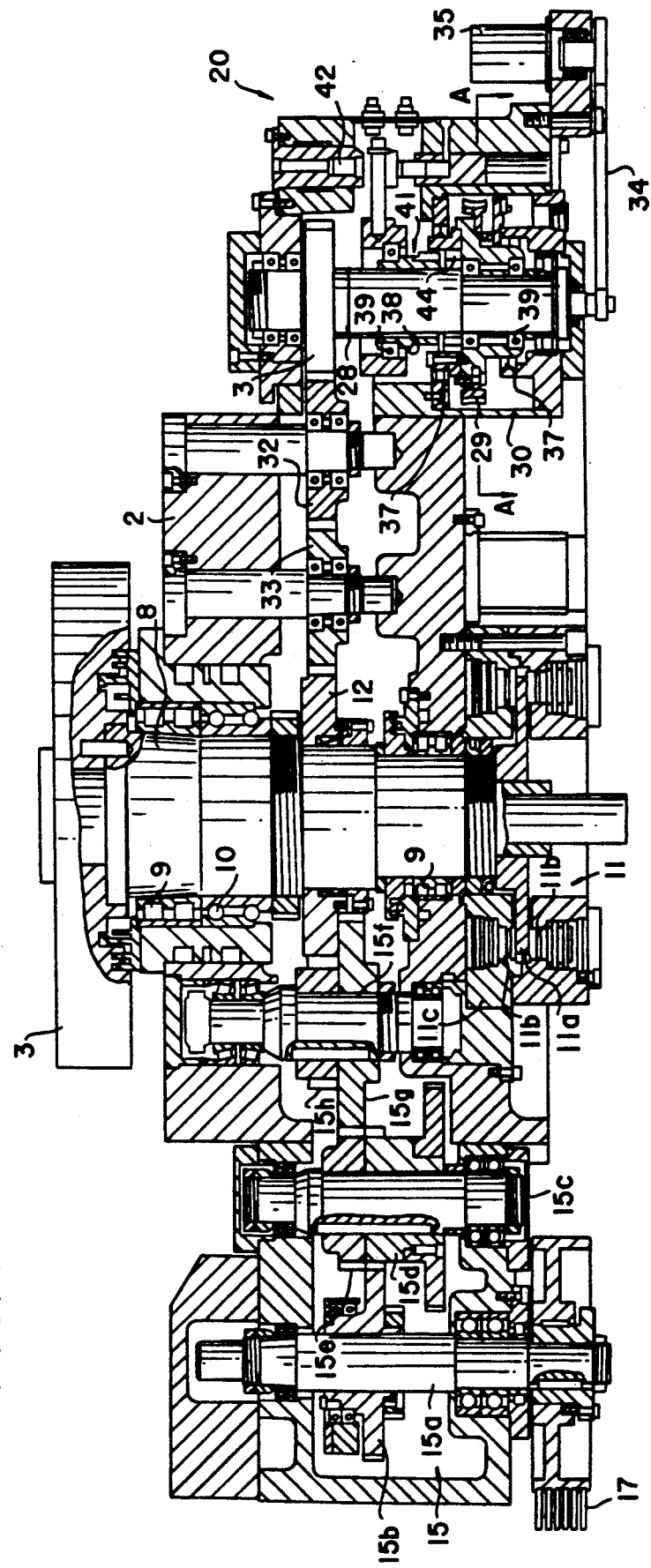
FIG. 4 is an overall longitudinal, sectional view of one embodiment of the present invention.

The above-mentioned main spindle 8 is mounted on the base table 2 in such a way as to be rotated freely through radial ball bearings 9 and a thrust bearing 10 as shown in FIG. 4. Further, the above-mentioned main spindle 8 has a clamping mechanism 11 mounted on the lower end portion thereof.

The above-mentioned clamping mechanism 11 comprises a disk 11a fixedly secured to the main spindle 8 and having pistons 11b mounted on the upper and lower surfaces thereof. The arrangement is made such that the disk 11a is held between these pistons 11b so as to clamp the turntable 3 through the intermediary of the main spindle 8, and each of the pistons 11b is accommodated in a hydraulic cylinder 11c so that they can be driven by fluid under pressure.

Further, fixedly secured to the intermediate portion of the above-mentioned main spindle 8 is a main gear 12 which engages with an output gear 15h of a speed change gear 15.

The above-mentioned speed change gear 15 is interposed between a turning motor 16 and the above-mentioned main gear 12 so as to change the rotational speed of the turntable 3, and the rotation of the turning motor 16 is input or transmitted through an endless belt 17 to an input shaft 15a of the speed change gear 15.

The above-mentioned input shaft 15a has a gear 15b which is splined thereto and which engages with a speed change gear 15d fixedly mounted on an intermediate shaft 15c so as to conduct speed change between the gears 15b and 15d.

The above-mentioned intermediate shaft 15c has a further gear 15e which is mounted fixedly thereon and which engages with a gear 15g fixedly mounted on an output shaft 15f. Further, the aforementioned output gear 15h fixedly mounted on the output shaft 15f is engaged with the above-mentioned main gear 12 so as to rotate the turntable 3 by the turning motor 16 through the intermediary of the main gear 12.

Whilst, in the drawings, reference numeral 20 denotes an indexing mechanism having an indexing motor 21 which is comprised of a servomotor which serves to rotate a worm 24 through the intermediary of gears 22 and 23.

Figure 5:
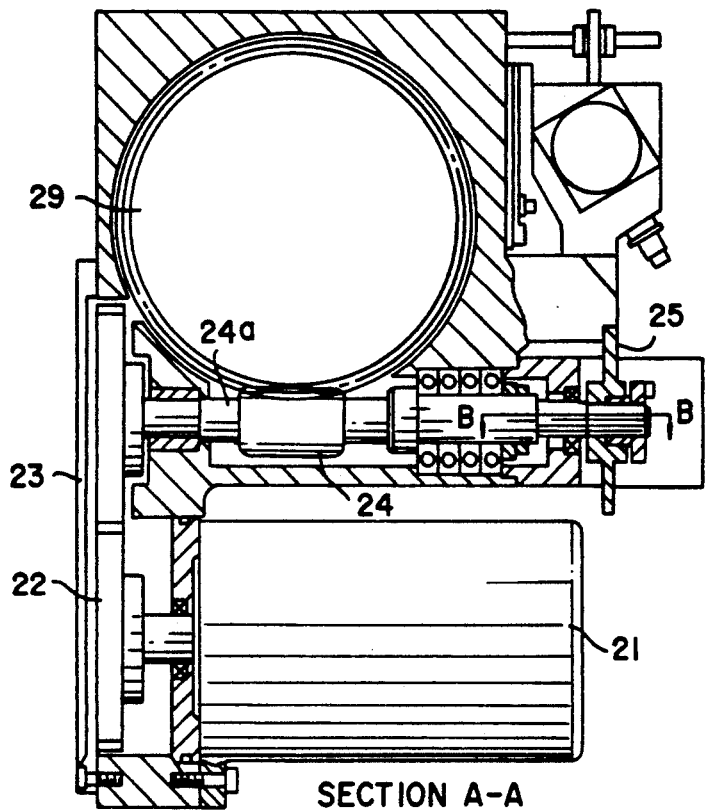
FIG. 5 is a schematic plan view of the embodiment shown in FIG. 4 including the partial horizontal sectional view of an indexing motor unit thereof.
Figure 6:
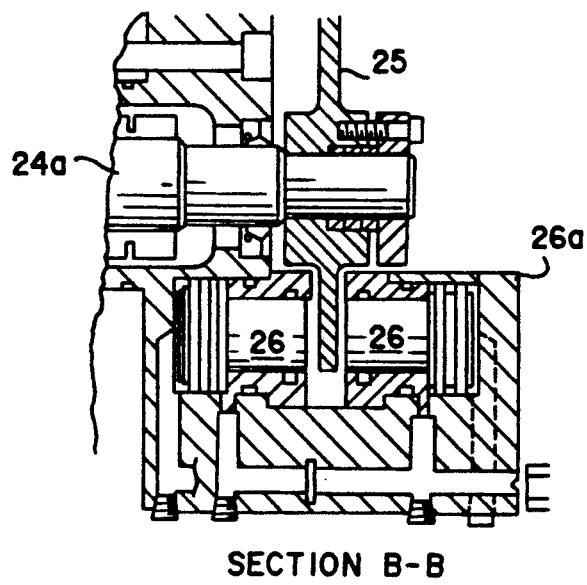
FIG. 6 is a longitudinal sectional view of a worm shaft clamping means of the embodiment shown in FIG. 4.

As shown in FIG. 5, fixedly secured to one end of a shaft 24a of the above-mentioned worm 24 is a disk 25 having a pair of pistons 26 mounted thereon in such a way as to hold or grip it therebetween. The above-mentioned pistons 26 are accommodated in a hydraulic cylinder 26a, and the arrangement is made such that fluid under pressure supplied into the hydraulic cylinder 26a causes the pair of pistons 26 to hold or grip the disk 25 therebetween to thereby lock the worm shaft 24a.

Further, the above-mentioned worm 24 is engaged with a worm wheel 29 fixedly secured to a rotating shaft 28.

The above-mentioned worm 24 and the worm wheel 29 are accommodated in a gear casing 30 filled with a lubricating oil having a high viscosity, and the upper end portion of the rotating shaft 28 has a gear 31 which is fixedly mounted thereon and which is engaged through the intermediary of gears 32 and 33, in turn, with the main gear 12.

And, the lower end of the rotating shaft 28 is connected by way of a timing belt 34 to a rotational angle detector 35 such as a potentiometer so that an angle of rotation of the turntable 3 can be detected by means of the rotational angle detector 35.

Further, in the drawing, reference numerals 37 denote oil seals which serve to separate a lubricating oil having a high viscosity for lubricating the worm 24 and the worm wheel 29 from a lubricating oil having a low viscosity for lubricating a pinion gear 38 mounted on a transmission 41 of the indexing mechanism 20 and bearings 39 which support the rotating shaft 28 rotatably so as to reduce the increase in resistance to flow of the lubricating due to stirring thereof during turning of the turntable 3.

Figure 7:
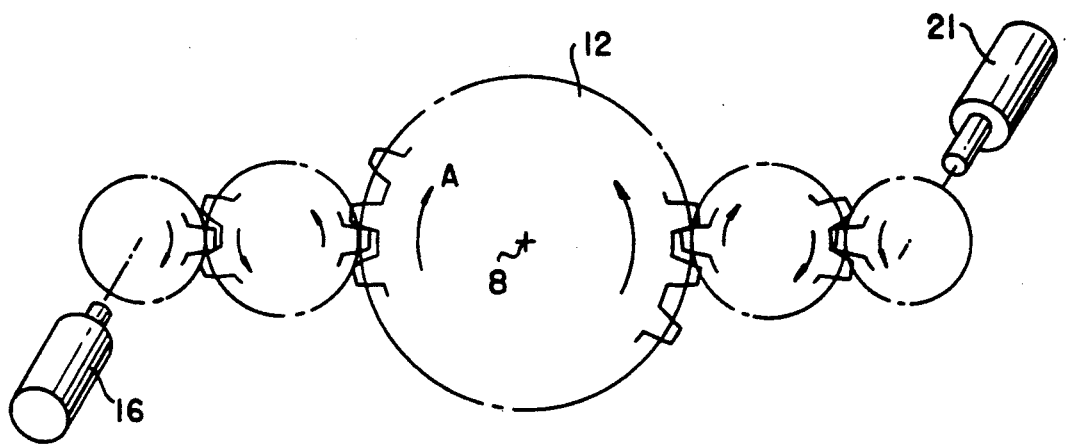
FIGS. 7 and 8 are explanatory views showing the operations of the embodiments of the present invention.

In the next place, the operation of the embodiment of the present invention will be described with reference to FIGS. 7 and 8. In case indexing of the position of a work, not shown, on the turntable 3 is made using the turntable 3 as an indexing table, detecting, first of all, the angle of rotation of the turntable 3 by the rotational angle detector 35 while turntable 3 is rotated by the turning motor 16 through the intermediary of the main gear 12 and transmitting a detection signal, and at the same time indexing the original position of the indexing motor 21 and transmitting an indexing signal, as shown in FIG. 7, and when coincidence of both the signals is obtained, a piston 42 is lowered through the action of fluid pressure so as to allow the pinion gear 38 of the transmission 41 to engage with a gear 44 fixedly secured to the worm wheel 29 to thereby enable the rotation of the indexing motor 21 to be transmitted to the rotating shaft 28.

Figure 8:
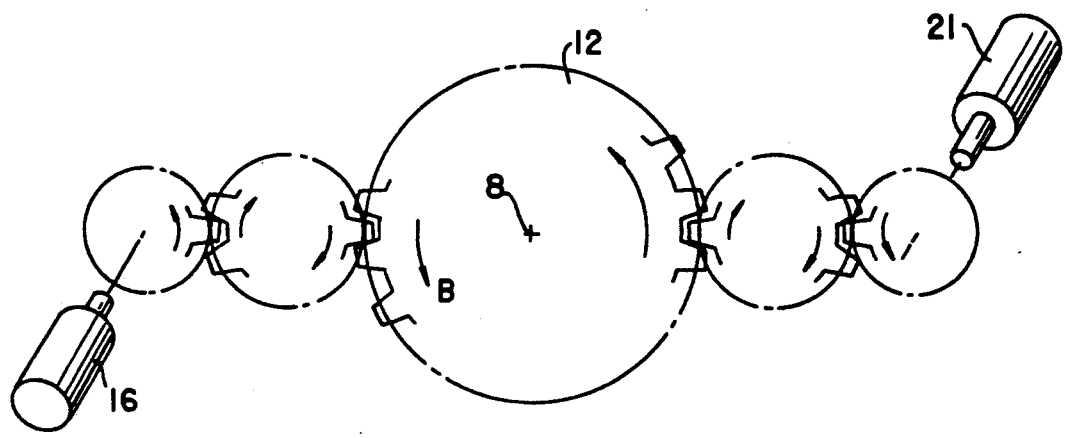

Subsequently, the turning motor 16 is rotated with its output torque limited to 10%, for example in a direction opposite to the rotational direction of the indexing motor so as to rotate the turntable 3 in a direction shown by arrow A, or as shown in FIG. 8, the turning motor 16 is rotated at somewhat higher speed in the same direction as the rotational direction of the indexing motor 21 so as to rotate the turntable 3 in a direction shown by arrow B so that the positioning of the turntable 3 can be made by rotating the same in a condition wherein the backlash in the driving system of the indexing motor 21 has been eliminated.

Subsequently, the disk 11a fixedly secured to the lower end of the main spindle 8 is held between the upper and lower pistons 11b in such a condition wherein the backlash in the driving system has been eliminated so as to clamp the main spindle 6, and at the same time the disk 25 fixedly secured to one end of the worm shaft 24a is held between the pistons 26 so as to clamp the worm shaft 24a.

This positioning operation enables the turntable 3 to be locked accurately and securely at a predetermined position, and also the worm shaft 24a is not pushed in the axial direction unlike the prior art turntable apparatus, and there is no possibility of the work getting out of position when it is clamped.

As described hereinabove, according to the present invention, since the indexing/driving system for indexing the turntable is provided separately from the turntable driving system so that the turntable can be indexed by the indexing/driving system while the driving force developed by the turntable driving system is limited during indexing operation, an accurate positioning of the turntable can be made in a condition wherein the backlash in each of the driving systems has been eliminated.

Since the arrangement is made such that after the positioning of the turntable the main spindle of the turntable and the indexing shaft of the indexing/driving system are clamped at the same time in a condition wherein the backlash in the driving system, the main spindle and the indexing shaft can be clamped in a pressurized condition so that the turntable can be locked accurately and securely at a predetermined position and also the indexing shaft is not pushed in the axial direction at the time of indexing thereby eliminating the disadvantage that the turntable gets out of position.

Further since the lubricating system for the worm driving system provided in the indexing mechanism is provided separately from the lubricating system for the transmission driving system and a lubricating oil having a low viscosity is used for the transmission system, such a disadvantage as during working of a work the lubricating oil is heated to cause a thermal deformation of the turntable and the accuracy or working is lowered can be eliminated.

I claim:

1. A turntable apparatus having a turntable in combination with an indexing mechanism for use in a universal machine tool, the turntable having a spindle, comprising:

a turntable driving system for driving the turntable;

a driving system for the indexing machine for separately driving said turntable, and which is separate from said turntable driving system, said driving system for the indexing mechanism having an indexing shaft;

first means for clamping the main spindle of said turntable;

second means for clamping said indexing shaft of said indexing mechanism driving system; and means for eliminating backlash in each of the turntable driving system and the driving system for the indexing mechanism;

wherein the turntable is rotated by said driving system for said indexing mechanism so as to conduct an indexing of the turntable in a condition wherein an output torque developed by said turntable driving system is limited to a relatively low level;

and wherein, after positioning of said turntable, the main spindle of said turntable and an indexing shaft of the indexing mechanism driving system are clamped at the same time in a condition wherein the backlash in each of the driving systems has been eliminated by said means for eliminating backlash.

2. A turntable apparatus having a turntable in combination with an indexing mechanism for use in a universal machine tool, the turntable having a spindle, comprising:

a turntable driving system for driving the turntable;

a driving system for the indexing mechanism for separately driving said turntable, and which is separate from said turntable driving system, said driving system for the indexing mechanism having an indexing shaft;

first means for clamping the main spindle of said turntable;

second means for clamping said indexing shaft of said indexing mechanism driving system; and means for eliminating backlash in each of the turntable driving system and the driving system for the indexing mechanism;

wherein the turntable is rotated by said driving system for said indexing mechanism so as to conduct an indexing of the turntable in a condition wherein an output torque developed by said turntable driving system is limited to a relatively low level;

wherein, after positioning of said turntable, the main spindle of said turntable and an indexing shaft of the indexing mechanism driving system are clamped at the same time in a condition wherein the backlash in each of the driving systems has been eliminated by said means for eliminating backlash;

said indexing mechanism having a worm driving system;

a first lubricating system for lubricating said worm driving system of said indexing mechanism and a second lubricating system for lubricating a transmission driving system separate from said first lubricating system, and wherein said worm driving system is lubricated with a lubricating oil having a high viscosity, and the transmission driving system is lubricated with a lubricating oil having a low viscosity.

* * * * *

UNITED STATES PATENT AND TRADEMARK OFFICE
CERTIFICATE OF CORRECTION

PATENT NO.: 5,188,004
DATED : February 23, 1993
INVENTOR(S): Hiroshi KITAGAWA

It is certified that error appears in the above-identified patent and that said Letters Patent is hereby corrected as shown below:

On the cover page, please add Items [22], [86] and [87] as follows:

[86] PCT No.: PCT/JP89/01288
§ 371 Date: June 14, 1991
§ 102(e) Date: June 14, 1991

[87] PCT Pub. No.: WO 90/06833
PCT Pub. Date: June 28, 1990

[22] PCT Filed: December 21, 1989

Signed and Sealed this

Seventh Day of June, 1994

Attest:

BRUCE LEHMAN

Attesting Officer

Commissioner of Patents and Trademarks